July 29, 1969  K. R. BANGERTER ET AL  3,457,733
TORQUE LIMITER
Filed June 16, 1967
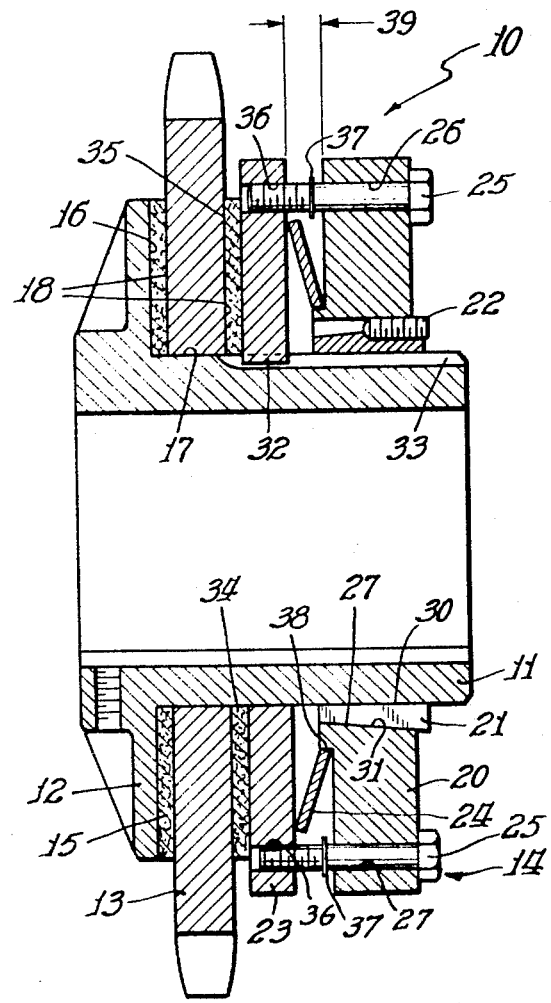
Inventors:
Kenneth R. Bangerter
and Harold A. Bernhardt
By: Evan D. Roberts Atty.

# United States Patent Office 3,457,733
Patented July 29, 1969

3,457,733
TORQUE LIMITER
Kenneth R. Bangerter and Harold A. Bernhardt, Ithaca, N.Y., assignors to Borg-Warner Corporation, Chicago, Ill., a corporation of Delaware
Filed June 16, 1967, Ser. No. 646,732
Int. Cl. F16d 7/02
U.S. Cl. 64—30                           2 Claims

ABSTRACT OF THE DISCLOSURE

A torque limiter is disclosed herein providing a structure whereby a drive element such as a sprocket is frictionally engaged by pressure plates under a resilient force of a given magnitude to provide a torque drive condition between the drive member and the pressure plates having a given drive torque magnitude above which the drive member will slip with respect to the pressure plates.

SUMMARY OF THE INVENTION

This invention relates to a torque limiter wherein a sprocket or other drive member is positioned on a hub between a hub flange and a pressure plate cartridge and is in frictional engagement with the hub pressure plate and the pressure plate cartridge. The cartridge is provided with an index plate securable to the hub and a cartridge pressure plate longitudinally slidable on the hub between the drive member and the index plate for frictionally engaging the drive member. A resilient means is provided between the cartridge pressure plate and the index plate of the cartridge and detachable means is provided to adjustably interconnect said cartridge pressure plate and the index plate to provide a predetermined static force therein. The cartridge is thereby adapted to exert the predetermined static force of the resilient means to yieldably frictionally retain the drive member between the hub pressure plate and the cartridge pressure plate when the interconnecting means of the cartridge is adjusted away from the cartridge pressure plate.

Other advantages and novel aspects of the invention will become apparent upon the following detailed description, in conjunction with the accompanying drawing wherein:

The drawing is a sectional view taken along a plane through the axis of a torque limiter showing one embodiment of the invention.

A torque limiter generally represented by the numeral 10 is shown in the figure for the purpose of illustrating and describing one embodiment of this invention. The torque limiter 10 includes, among other things, an axial hub pressure plate 11, a flange 12, a sprocket drive member 13, and a pressure plate cartridge 14. The flange 12 is secured to the hub 11 so as to be rotatable therewith and is provided with frictional material 15 having a radial surface 16 for engaging the drive member 13. The sprocket drive member 13 is rotatably and slidably mounted on cylindrical surface 17 of the hub 11. The sprocket 13 is also provided with opposite radial drive surfaces 18.

The pressure plate cartridge 14 includes generally a cartridge index plate 20, a tapered locking bushing 21, locking screws 22, a cartridge pressure plate 23, a disc spring washer resilient member 24, and a series of circumferentially spaced interconnecting compression bolts 25.

The index plate 20 is provided with clearance holes 26, and a tapered inside surface 27. The tapered locking bushing 21 has an inside surface 39 adapted to slide over the surface 17 of the hub 11, and has an outside tapered surface 31 generally complemental with the index plate surface 27. The locking screws 22 are threadably mounted in the locking bushing 21 and in the index plate 20. The index plate 20 is radially axially positioned on the surface 17 of the hub 11 by tightening the lock screws 22 in the index plate 20 and the bushing 21, whereby the bushing 21 is wedged between the inside surface 27 of the index plate 20 and the surface 17 to secure the index plate 20 in position.

The pressure plate 23 is provided with a key 32 slidably mounted in a keyway 33 of the hub 11 so that the plate 23 is movable on surface 17 of the hub 11 and yet is adapted to transmit torque from the hub 11. A friction material 34 is provided on the cartridge pressure plate 23 with a surface 35 adapted to engage the driving surface 18 of the sprocket 13. The cartridge pressure plate 23 is further provided with threaded apertures 36 which are aligned with the clearance openings 26 of the index plate 23 so that a bolt 25 inserted through the clearance opening 26 may be threaded into the aperture 36 of the cartridge pressure plate 23.

A retaining ring 37 is provided on the bolt 25 at an axial distance from the head of the bolt 25 so that when the bolts 25 are unscrewed from the cartridge pressure plate 23, they will be retained in the respective clearance apertures 26 of the index plate 20. The disc spring washer 24 is located on a shoulder 38 of the index plate 20 so that when the bolts 25 are threaded into the cartridge pressure plate 23, a predetermined distance 39 will be maintained between the index and cartridge plates 20 and 23. The washer 24 will be compressed to provide a predetermined static force tending to urge the cartridge and index pressure plates 23 and 20 apart with a selected force directly dependent upon the distance 39 therebetween.

In preparing the torque limiter 10 for operation, the cartridge 14 is preadjusted, preset or preloaded with static force which may be selectively released to activate the torque limiter. This preadjustment may be performed on the cartridge with the cartridge 14 detached from the torque limiter 10, as well as with the cartridge 14 attached to or positioned on the torque limiter 10. The preadjustment is made by tightening the screw 25 to draw the index plate 20 and the cartridge pressure plate 23 to a predetermined distance 39 therebetween, whereby the disc spring 24 will be placed in a predetermined static loading.

It is particularly worthy to note that one or more cartridges 14 may be preadjusted or preloaded in this manner to respectively varied magnitudes in the detached condition. The cartridge structure of this invention thereby provides a decided advantage, among others, over the prior art by providing a selection of various magnitudes for torque limiting purposes by having a selection of varied preloaded cartridges readily available.

A cartridge 14, which is preloaded as indicated above, is thereafter selected and placed on the surface 17 of the hub 11 with the key 32 of the cartridge pressure plate 23 positioned in the keyway of the hub 11 and with the surface 35 of the cartridge pressure plate friction material 34 in engagement with the surface 18 of the sprocket 13 so that the opposite surface 18 of the sprocket 13 will likewise be in snug engagement with the surface 16 of the surface 15 of the flange 12. Thus, the movable elements of the torque limiter are axially positioned on the hub 11.

The index plate 20 is then secured against axial movement on the hub by tightening the locking screws 22. The locking bushing 21 is thereby drawn into the index plate 20 to wedge the locking plate 21 between the pressure plate 20 and the hub surface 17 whereby the index plate 20 will be secured against axial movement upon the hub 11. Under these conditions, the friction material 34 of the cartridge 14 and the friction material 15 of the flange 12 are only in snug relationship with the friction surface 18 and the sprocket 13.

To complete the preparation of the torque limiter, the bolts 25 are unscrewed from the fitted apertures 36 of the cartridge pressure plate 23 to allow the disc spring 24 to exert its preinduced static force against the cartridge pressure plate 23. This will provide a predetermined engagement of the friction surfaces 15 and 34 with the sprocket 13 as determined by the original distance 39 provided in the cartridge 14 by the bolts 25 before the cartridge 14 was placed on the hub 11.

Thus, it can be seen that the torque limiting frictional characteristics between the sprocket 13 and the friction material 15 and 34 of the torque limiter, which is in engagement therewith, can be readily pre-selected and provided at various magnitudes by varying the distance 39 of any given cartridge 14, or by providing a number of cartridges 14 having pre-selected varying distances 39. This structure can thereby be readily utilized to selectively provide a predetermined torque limiting relationship in the torque limiter 10 for each respective cartridge 14 or cartridge adjustment setting 39.

Further, it should be noted that the means 21 and 22 for securing the index plate 20 with the hub 11 is independent of the invention. In this regard, other generally known means for securing a plate to a hub may be utilized without deviating from the scope of the invention. For example, the pressure plate 20 could be a clamp in itself with a screw mechanism therein to tighten same on the hub 11 to frictionally engage the hub 11.

It is to be understood that the invention is not to be limited to the specific constructions and arrangements shown and described, as it will be understood to those skilled in the art that changes may be made without departing from the principles of the invention.

What is claimed is:
1. An improved torque limiting mechanism comprising a hub, and an axial hub pressure plate secured to said hub; and a pressure plate cartridge adapted to be detachably secured to said hub to frictionally engage a drive member between said hub pressure plate and said pressure plate cartridge with a predetermined axial force, said cartridge having an index plate adapted to be secured to said hub, a cartridge pressure plate slidable on said hub between said drive member and said index plate and adapted to frictionally engage said drive member, a resilient means positioned between said cartridge pressure plate and said index plate, and means adjustably interconnecting said cartridge pressure plate and said index plate for compressing and retaining said resilient means in compressed condition between said cartridge pressure plate and said index plate to provide a predetermined static force in said resilient means, whereby said cartridge will exert the predetermined static force of said resilient means against said drive member through said cartridge pressure plate when said cartridge index plate is secured to said hub with said drive member in engagement with the hub and cartridge pressure plate and said compression and retaining means is adjusted away from said cartridge pressure plate.

2. An improved torque limiting mechanism comprising a hub, and an axial hub pressure plate secured to said hub; and a pressure plate cartridge adapted to be detachably secured to said hub to frictionally engage a drive member between said hub pressure plate and said pressure plate cartridge with a predetermined axial force, said cartridge having an index plate adapted to be secured to said hub, a cartridge pressure plate axially slidably mounted on said hub and keyed therewith against radial movement with respect to said hub and positioned between said drive member and said index plate for frictionally engaging said drive member, an annular shoulder concentrically positioned on said index plate between said cartridge pressure plate and said index plate, a resilient disc spring washer positioned on said shoulder, and a series of circumferentially spaced compression bolts positioned in axial clearance passages in said pressure plate and threadably mounted in corresponding apertures in said cartridge pressure plate for compressing and retaining said resilient disc spring in compressed condition between said cartridge pressure plate and said index plate to provide a predetermined static force in said resilient disc spring whereby said cartridge will exert the predetermined static force of said resilient disc spring against said drive member through said cartridge pressure plate when said cartridge index plate is secured to said hub with said drive member in engagement with the hub and cartridge pressure plate and said compression bolts are detached from said cartridge pressure plate.

References Cited

UNITED STATES PATENTS

| 2,535,842 | 12/1950 | Criley | 64—30 X |
| 2,857,750 | 10/1958 | Fox | 64—30 |
| 3,020,737 | 2/1962 | Firth | 64—11 |
| 3,201,953 | 8/1965 | Firth | 64—30 |

FOREIGN PATENTS 696,160 10/1930 France.

HALL C. COE, Primary Examiner

U.S. Cl. X.R.

66—49, 50